SYNCHRONIZING CIRCUIT

Filed June 9, 1947

INVENTORS
ERIC L.C. WHITE
& EDWARD A. NEWMAN
BY H. S. Grover
ATTORNEY

UNITED STATES PATENT OFFICE 2,535,247

SYNCHRONIZING CIRCUIT

Eric Lawrence Casling White, Iver, and Edward Arthur Newman, Ealing, London, England, assignors to Electric & Musical Industries Limited, Hayes, England, a company of Great Britain Application June 9, 1947, Serial No. 753,510
In Great Britain April 20, 1946

Section 1, Public Law 690, August 8, 1946
Patent expires April 20, 1966

4 Claims. (Cl. 178—69.5)

Figure 1:
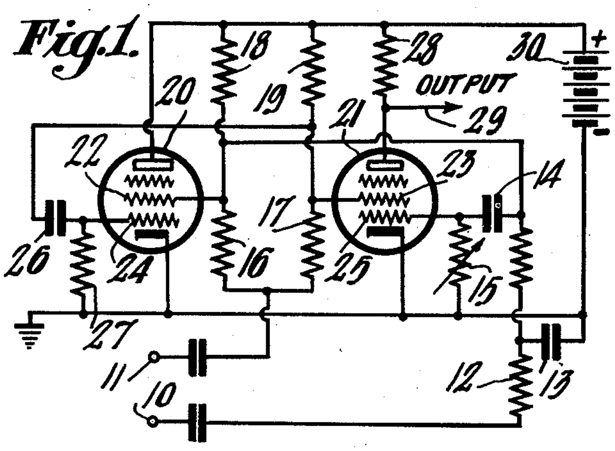

The present invention relates to circuits for generating electrical impulses, and has particular but not exclusive application to generating frame synchronising pulses in television.

The object of the present invention is to provide a circuit for generating electrical impulses of a duration coincident with an integral number of periods of a sequence of impulses under the control of switching impulses.

According to the invention there is provided a circuit for generating, under the control of switching impulses, electrical impulses which commence with one of a sequence of impulses and terminate with another impulse of said sequence, said circuit comprising a pair of valves arranged so that normally one of said valves is conducting and the other is non-conducting and having means for applying said sequence of impulses to both of said valves and said switching impulses to at least one of said valves, the arrangement being such that on the application of a switching impulse said valves are conditioned so that one of said sequence of impulses causes the conducting and non-conducting conditions of said valves to be interchanged and another impulse of said sequence causes said valves to be restored to their previous conditions whereby said electrical impulses are generated in the output circuit of one or other of said pair of valves.

In television, in order to synchronise the line scanning at the receiver with the line scanning at the transmitter, the transmitted picture signals are interspersed with line synchronising signals. When the full number of lines constituting a single frame scan is accomplished a fresh frame scan is commenced and to synchronise the frame scans frame synchronising signals are transmitted which have a different form from the line synchronising signals. Such frame synchronising signals may consist of a sequence of line synchronising signals which have been broadened. With such signals the line synchronising action is permitted to continue undisturbed, which is advantageous from the point of view of the line scanning generator in the receiver, but although the line synchronising signals effectively continue as before, frame synchronising action is at the same time introduced. In practice it has been customary to employ a form of frame synchronising signal that differs slightly from that just described in that broadened line synchronising signals of double line frequency are employed so as to permit so-called interlaced scanning. The present invention is particularly concerned with generating a square impulse termed a frame synchronising keying impulse lasting for the same duration as such a frame synchronising signal. Such keying impulses can be employed in the generation of the frame synchronising signals. In applying the invention to the generation of said frame synchronising keying impulses, the given impulses may be synchronising impulses of double line frequency and the switching impulses may be pulses used for frame scanning control at the transmitter of duration equal to, or greater by a small extent than, that of the keying impulses to be generated.

In order that the said invention may be clearly understood and readily carried into effect, the same will now be more fully described with reference to the accompanying drawings, in which—

Figure 2:
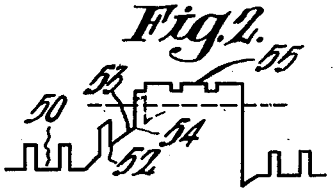
Figure 3:
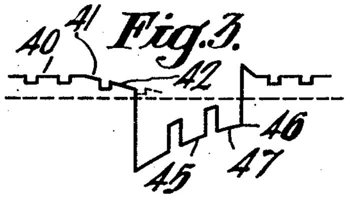
Figure 4:
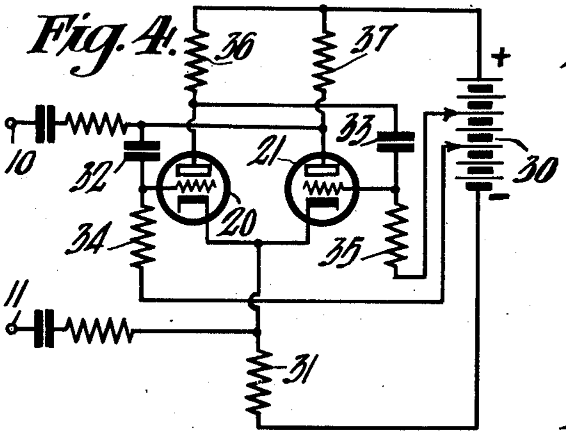
Figure 5:
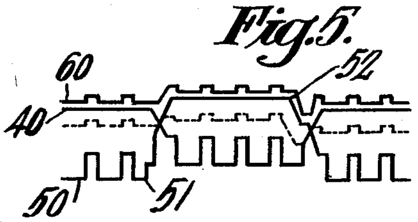
Figure 6:
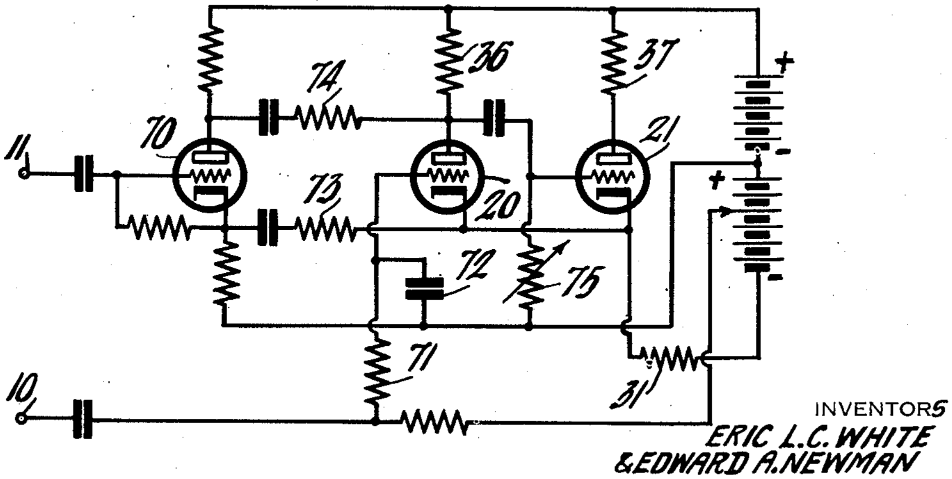

Figure 1 illustrates a circuit arrangement according to one embodiment of the invention, Figures 2 and 3 illustrate the waveform of potential variations set up in the circuit arrangement of Figure 1, Figure 4 illustrates a circuit arrangement according to a further embodiment of the invention, Figure 5 illustrates the waveform of potential variations set up in the circuit arrangement of Figure 4, and Figure 6 illustrates a circuit arrangement according to a further embodiment of the invention.

Referring to Figure 1 there is shown diagrammatically an application of the present invention to the generation of frame synchronising keying impulses in television under the control of broad impulses of double line frequency and of frame synchronising impulses the latter being employed as switching impulses. The frame synchronising impulses in negative sense are fed to terminal 10 and thence via the low-pass filter formed by resistance 12 and capacity 13 to the screen grid 22 of valve 20 and through the coupling circuit constituted by capacity 14 and variable resistance 15 to the control grid 25 of valve 21. The broad double line frequency impulses are applied to terminal 11 in positive sense and are fed through resistance 16 and 17 respectively to the screen grids 22 and 23 of valves 20 and 21 respectively. Screen grids 22 and 23 are connected to the positive terminal of supply 30 via load resistances 18 and 19. The screen grid 22 of valve 20 is coupled with control grid 25 of valve 21 through capacity 14 and resistance 15 and the screen grid 23 of valve 21 is coupled through capacity 26 and resistance 27 to the control grid 24 of valve 20. It will be appreciated that screen grids 22 and 23 and control grids 24 and 25 of valves 20 and 21 are coupled so as to form a so-called trigger circuit. The time constant associated with control grid 25 is adjustable by virtue of the adjustability of resistance 15 and is adjusted to give the desired duration of the generated frame synchronising keying impulses. The time constant associated with control grid 24 is chosen long compared with the period of the frame synchronising impulses. The anode of valve 20 is connected directly to the positive terminal of supply 30 and the anode of valve 21 is connected to the same terminal through load resistance 28. The desired frame synchronising keying impulses are set up at the anode of valve 21 and may be derived via lead 29.

Figure 2 shows the waveform of potential developed at the control grid 24 of the circuit of Figure 1 and Figure 3 shows the waveform of potential that is set up at control grid 25. In both Figures 2 and 3 the horizontal dotted line indicates the level of grid cut-off. As shown the waveforms commence with the valve 21 conducting and the valve 20 non-conducting. Thus the broad double line frequency impulses appear at grid 25 as shown by portion 40 of the waveform of Figure 3 to be amplified by valve 21 and so appear enlarged and in negative sense at grid 24 of valve 20 as shown by portion 50 of the waveform of Figure 2. At point 41 in Figure 3 a negative frame impulse is effective so as to initiate the generation of the desired keying impulses. By virtue of the action of low-pass filter 12, 13 the potential of grid 25 then commences to fall with the occurrence of said frame impulse as indicated by portion 42 in Figure 3 setting up the rising curve of potential 52 of Figure 2 at grid 24. At instant 54 in Figure 2 corresponding to the termination of negative broad impulse 53 the grid 24 is carried positive of the cut-off level and the trigger circuit switches over to the other of its two states. Valve 20 is now conducting and valve 21 non-conducting. Positive broad double line frequency impulses from terminal 11 now appear on grid 24 corresponding to the portion of waveform 55 shown in Figure 2. These are amplified by valve 20 so as to appear large and in negative sense at the control grid 25 of valve 21 as indicated by the portion 45 of the waveform of Figure 3. This portion is a rising curve by virtue of the short time constant associated with grid 25. At point 46 with the termination of broad pulse 47 the grid 25 is consequently carried above cut-off and the trigger circuit reverts to its original state. A single square frame synchronising keying impulse is thus set up at the anode of valve 21. It will be appreciated that its duration depends upon the steepness of the rising portion 45 of the curve of Figure 3 which steepness may be adjusted by adjusting the resistance 15. Whatever may be the duration of a keying impulse as generated it starts always at the end of a broad impulse of double line frequency and ends in the same way with another. The frame synchronising impulses act as switching impulses to bring about the generation of the keying impulses.

Figure 4 shows a slight modification of the circuit of Figure 1. In this modification the valves 20 and 21 of the trigger pair have a common cathode circuit impedance 31 and the broad impulses of double line frequency are not fed in positive sense to screen grids in the valves but negatively to the coupled cathodes. Moreover the frame synchronising impulses are applied not in negative sense to terminal 10 but in positive sense, and to the anode of valve 21. In order to generate the desired keying impulses the valves 20 and 21 require to be provided with no other electrodes than those necessary for the pair to function in trigger manner, that is to say they may be triodes as shown. In this case the control grid of valve 20 is coupled via condenser 32 to the anode of valve 21 and the control grid of valve 21 is coupled via condenser 33 to the anode of valve 20, the control grids being connected to suitable tapping points on the supply source 30 via resistances 34 and 35. The anodes of the valves 20 and 21 are connected to said source by load resistances 36 and 37. The generated frame synchronising keying impulses can be derived in positive sense from the anode of valve 21 or negative sense from the anode of valve 20. In Figure 5 curve 40 shows the waveform of potential set up in the grid of valve 21 and curve 50 shows that set up on the grid of valve 20. Curve 60 indicates the variation of potential of the cathodes of valves 20 and 21 and the dotted curve indicates the triggering level. The circuit is of value when both the start and finish of the keying impulses are to be determined coarsely by the start and finish of the frame synchronising impulses. In the circuit of Figure 1 the start of the keying impulses is determined coarsely by the frame synchronising impulses and the finish is determined coarsely by the time constant associated with the grid of valve 21. In the case of Figure 4 the time constants associated with both grids of valves 20 and 21 are long compared with the period of the cycle of operation. In Figure 5 the point 51 on curve 50 indicates the commencement of a frame synchronising impulse and point 52 its termination. The keying impulse is started with the end of the broad impulse during which the commencement of the frame synchronising impulse occurs and finished with the end of the broad double line frequency impulse during which the termination of the frame synchronising impulse occurs. As a modification of the circuit the frame synchronising impulses may be applied reversed in sense to the anode of valve 20. In another modification either or both of the time constants associated with the grids of the trigger pair may be made short and the length of the generated keying impulse will then depend on them, though still being limited to an integral number of broad double line frequency impulse periods.

In Figure 6 there is illustrated a further modification of the circuit of Figure 4. In this modification one of the cross couplings of the trigger pair is omitted, namely that from the anode of valve 21 to the grid of valve 20. In this circuit the frame synchronising impulses are applied to the grid of valve 20 in positive sense from terminal 10 through a low-pass filter formed by resistance 71 and condenser 72. Negative broad double line frequency impulses as before are applied to the cathodes of the pair from terminal 11, but as such impulses are now only effective during one-half of the trigger cycle, in view of the omitted cross coupling, such broad impulses, but in positive sense, are also applied to the anode of valve 20. For this purpose as shown in Figure 6 a valve 70 serves to repeat the negative broad impulses applied to terminal 11 in the same sense at the cathodes of the pair 20 and 21 and in opposite sense at the anode of valve 20 said broad impulses being so applied via resistances 73 and 74. The desired keying impulses are set up at the anode of valve 21. It is necessary to proportion the resistances 73 and 74 coupling the cathode and anode respectively of valve 70 to the trigger pair so that the impulses applied to the cathode of valve 20 shall have an over-riding effect over those applied to the anode of the valve. Thus if equal and opposite variations are set up at anode and cathode of valve 70 resistance 73 should be of about half the magnitude of resistance 74. The duration of the keying impulse generated is set coarsely by the time constant associated with the grid of valve 21, and variable resistance 75 serves for adjusting this time constant.

We claim:

1. In television apparatus, a circuit for generating frame keying impulses which comprises a pair of valves, means interconnecting said valves for making one valve non-conducting when the other valve becomes conducting, a source of line synchronizing impulses, a source of frame synchronizing impulses, means for applying said line synchronizing impulses simultaneously to both of said valves, means for applying said frame synchronizing impulses to one of said valves to condition it to be made non-conducting by one of said line synchronizing impulses, the other valve being made conducting thereby, and means for causing a subsequent line impulse to reverse the conducting and non-conducting conditions of the respective valves.

2. A pulse generator comprising a first tube having at least a plate, a grid and a cathode, a second tube having at least a plate, a grid and a cathode, a source of fixed potential, individual impedances connected between said plates and one side of said source, a common impedance connected between said cathodes and the other side of said source, coupling means connected between the plate of said first tube to the grid of the second tube, coupling means connected between the plate of the second tube and the grid of the first, means for applying a first series of pulses to one of said grids, means for applying a second series of pulses to said cathodes, and an output circuit connected to one of said plates.

3. A circuit for generating frame keying impulses as described in claim 1 in which said means for applying said frame synchronizing impulses to one of said valves to condition it to be made non-conducting by one of said line synchronizing pulses is comprised of the other of said valves.

4. A circuit for generating frame keying impulses as described in claim 1 in which said means for applying said frame synchronizing impulses to one of said valves to condition it to be made non-conducting by one of said line synchronizing pulses includes a low pass filter network.

ERIC LAWRENCE CASLING WHITE.
EDWARD ARTHUR NEWMAN.

REFERENCES CITED

The following references are of record in the file of this patent:

UNITED STATES PATENTS

| Number | Name | Date |
|---|---|---|
| 2,306,386 | Hollywood | Dec. 29, 1942 |
| 2,309,506 | Herbst | Jan. 26, 1943 |
| 2,405,237 | Ruhlig | Aug. 6, 1946 |